March 22, 1960 V. DURBIN ET AL 2,929,883

FIELD TELEPHONE HAND SET

Filed May 28, 1954 8 Sheets-Sheet 1

INVENTORS
VERNON DURBIN
ERNEST W. JOHNSON
BY James and Franklin
ATTORNEYS

March 22, 1960 V. DURBIN ET AL 2,929,883

FIELD TELEPHONE HAND SET

Filed May 28, 1954 8 Sheets-Sheet 2

INVENTORS
VERNON DURBIN
ERNEST W. JOHNSON
BY James and Franklin
ATTORNEYS

March 22, 1960 V. DURBIN ET AL 2,929,883

FIELD TELEPHONE HAND SET

Filed May 28, 1954 8 Sheets-Sheet 3

INVENTORS
VERNON DURBIN
ERNEST W. JOHNSON
BY James and Franklin
ATTORNEYS

March 22, 1960 V. DURBIN ET AL 2,929,883

FIELD TELEPHONE HAND SET

Filed May 28, 1954 8 Sheets-Sheet 4

INVENTORS
VERNON DURBIN
ERNEST W. JOHNSON
BY
James and Franklin
ATTORNEYS

FIELD TELEPHONE HAND SET

INVENTORS
VERNON DURBIN
ERNEST W. JOHNSON
BY James and Franklin
ATTORNEYS

FIELD TELEPHONE HAND SET

Filed May 28, 1954 8 Sheets-Sheet 6

INVENTORS
VERNON DURBIN
ERNEST W. JOHNSON
BY James and Franklin
ATTORNEYS

INVENTORS
VERNON DURBIN
ERNEST W. JOHNSON
BY James and Franklin
ATTORNEYS

INVENTORS
VERNON DURBIN
ERNEST W. JOHNSON
BY James and Franklin
ATTORNEYS

United States Patent Office 2,929,883

Patented Mar. 22, 1960

2,929,883

FIELD TELEPHONE HAND SET

Vernon Durbin, Waban, and Ernest W. Johnson, Everett, Mass., assignors to National Pneumatic Company, Inc., Boston, Mass., a corporation of Delaware Application May 28, 1954, Serial No. 433,052

2 Claims. (Cl. 179—84)

The present invention relates to a field telephone hand set of improved construction and operation.

Field telephones, particularly those of the type used by the military, are subject to numerous requirements which, because of the nature of the use to which the instruments are put, are quite critical. Operation-wise, the hand set, in addition to providing means for verbal communication, must also include means for apprising the user that some other station wishes to speak to him and means for permitting the user to "ring" someone else on the circuit. An audible call indication means is conventionally employed, usually in the form of a buzzer. The sound of the buzzer must be sufficiently strong so that, when energized, it will carry above the sound of actual combat. On the other hand, as when the instrument is being used in a secret advance position or on a scouting mission, a sound of such magnitude is inadmissible. According to the present invention, a buzzer of novel construction is employed by means of which the volume of the sound emanating therefrom may readily be controlled, thus conditioning the unit for operation best adapted to the surrounding circumstances.

In addition to an audible call indicator, actuated only during the time that a station is actually being "rung" or called, some form of visual call indication is also desired, for use when any audible call, no matter how faint, would be dangerous, and also for use when the instrument is temporarily unattended, so as to indicate that the particular station had been called at some time previously. The visual call indicator means therefore must be sufficiently sensitive as to be actuated by the small amounts of power available in communication lines of the type in which these instruments are used, such lines generally having no battery voltage source connected thereto, and the visual call indicator must also be capable of "latching" in actuated condition so that it will be effective as an indicator even after the actual ringing impulses have stopped. The conventional type of latch, operating on a detent or similar principle, requires an excessive amount of power, since some force must be employed in order to set the latch or detent over and above that required to actuate the indicator in the first instance. According to the present invention, a magnetic latching arrangement is employed in conjunction with the visual indicator which not only reduces the amount of power required to be exerted on the indicator in order to move it to actuated position, but requires no additional power to latch the indicator in that position.

Instruments of the type under discussion must, of course, be sturdy and reliable. They are, nevertheless, extremely delicate instruments, and consequently maintenance problems loom large in maintaining a communication network in operating condition. In order to facilitate the maintenance problem and reduce the spare part problem, always troublesome and particularly so at advanced stations, the hand set of the present invention is so designed as to facilitate access to the operative parts thereof and replacement of those parts. The housing, a unitary structure, carries separable receiver and transmitter units on the exterior thereof, these units being replaceable without affecting the remainder of the instruments and without requiring any special steps for effecting electrical connection. All of the other electrical components, including the audible indicator assembly, the visual indicator assembly, the ringing generator, and the switching mechanism appropriate to the electrical circuits involved, are adapted to be inserted into and removed from the housing as a single electrical unit, and independently of the transmitter and receiver. That electrical unit is in turn composed of three separate subassemblies, each readily removable from the other for purposes of repair and replacement. These sub-assemblies are the audible indicator assembly, the visual indicator assembly, and the power unit assembly, the latter including the ringing generator and the switching instrumentalities. The electrical unit is adapted to be inserted into the housing through an open end thereof, that end being closed and sealed by a cover integrated with the aforementioned electrical unit. As a result of this arrangement, if any part of the hand set should fail, it can be replaced in a matter of seconds in an emergency. The transmitter and receiver need merely be unscrewed and a new transmitter or receiver screwed into place. Upon failure of any other part, the entire electrical unit can be removed merely by unfastening the cover, and a new unit, complete with cover, is slid into place. However, the entire removed electrical unit need not be discarded or sent to the rear for extensive repair if the trouble is localized in any one of the individual sub-assemblies which make up that unit. That sub-assembly can be detached from the overall electrical unit, a new sub-assembly put in its place, and the electrical unit reinserted into the housing.

By reason of the construction of the individual subassemblies and the manner in which they are connected and interrelated structurally and functionally, a sturdy and reliable field telephone hand set is produced which is well capable of withstanding the conditions to which it will be subjected in use, which functions in an improved manner with respect both to the audible and visual ringing indications, and in which repair and replacement is facilitated to an exceptional degree.

To the accomplishment of the above, and to such other objects as may hereinafter appear, the present invention relates to the construction and arrangement of parts of a field telephone hand set, as defined in the appended claims and as described in this specification, taken together with the accompanying drawings, in which:

*General description*

Figures 1, 2:
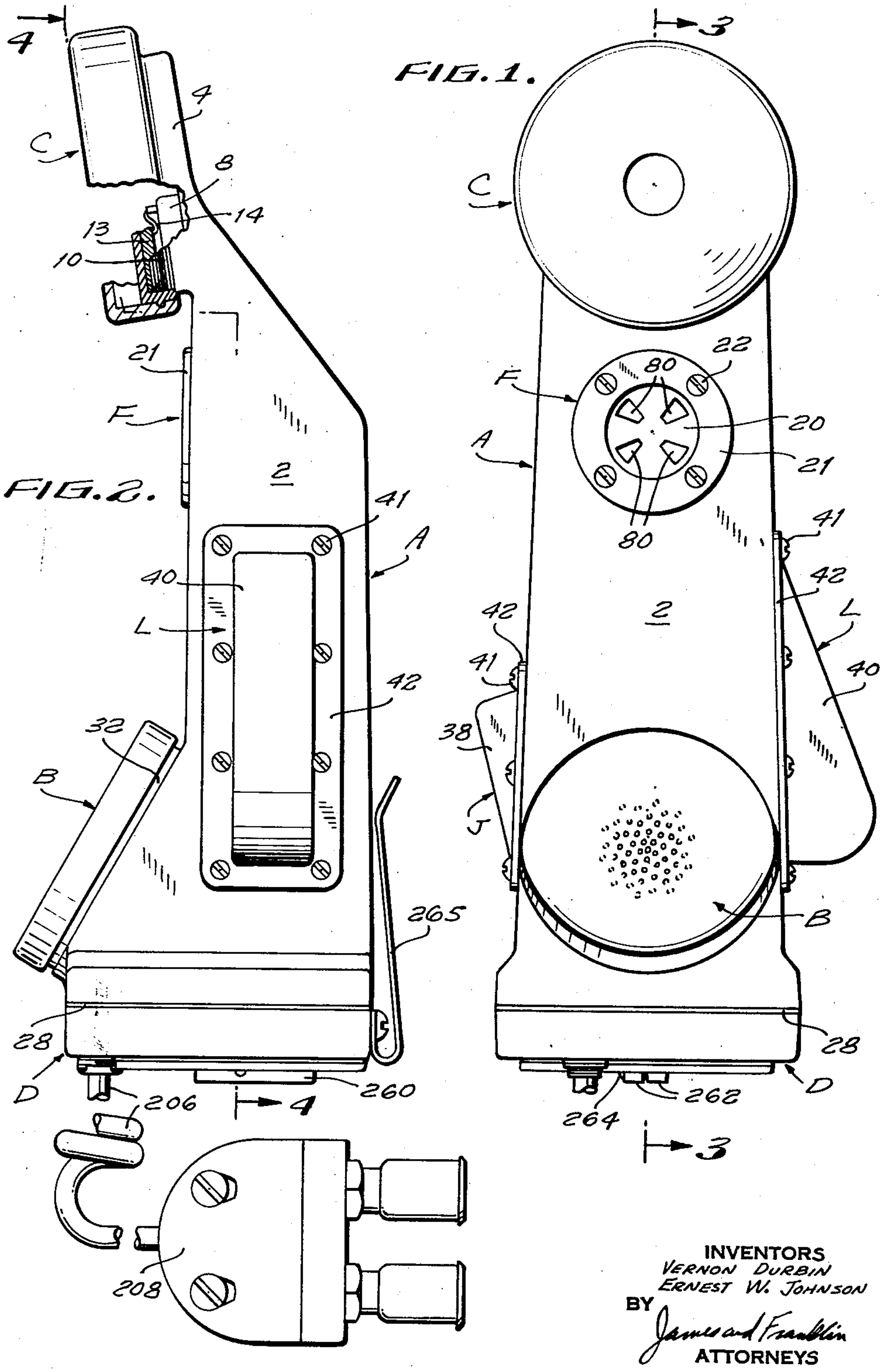
Fig. 1 is a front elevational view of an assembled hand set.
Fig. 2 is a side elevational view thereof, partially broken away.

The hand set of the present invention comprises a housing generally designated A of a size and shape adapted to be held in the hand, a transmitter B and a receiver C being mounted thereon on the exterior thereof and being oriented so as to be simultaneously placeable against the ear and the front of the mouth of the user respectively, as is conventional. The details of the transmitter B and receiver C form no part of the present invention and they will not here be disclosed, it being sufficient to state merely that they may be of a type conventionally employed in sound powered communication systems. One end of the housing A, the end remote from the receiver C, is closed and sealed by a cover D and mounted on that cover D is an electrical unit generally designated E, that unit, in turn, being formed of two sub-assemblies, to wit, and reading from top to bottom, a visual indicator assembly F and a power unit assembly G. An audible indicator assembly H is also secured to the cover D. Also included in the electrical unit E are the appropriate switching and actuating instrumentalities and the necessary electrical components. Each of the sub-assemblies F, G and H are individually removable and those sub-assemblies, when once connected together and to the cover D, are removable as a unit with the cover D.

As is conventional, a talk-listen switch J is provided which assumes a normal position suitable for listening and which must be depressed in order to condition the hand set for transmission. The power unit G includes a ringing generator K adapted to be actuated by means L whenever the user of the hand set wishes to call or "ring" another party on his communication line. The switch J and actuating means L are appropriately connected to and actuate switches which condition the electrical circuits of the hand set for the operation being performed, all as will be described more in detail hereinafter.

*The housing*

The housing A is preferably formed of a unitary piece of material such as molded or cast metal or the like. It has an elongated central portion 2 adapted to be grasped by the hand of the user and carrying at its upper end a receiver-supporting portion 4 separated from the hollow interior 6 of the central portion 2 by means of a wall 8. The receiver-supporting portion 4 is externally threaded at 10, the receiver C being threadedly received thereover, terminal points 12 being provided on housings 13 secured by screws 15 to the outwardly facing portion of wall 8, with which corresponding terminal points of the receiver C are adapted to make electrical connection when the receiver C is screwed into place, those terminal points 12 being electrically connected to leads 14 which pass through the wall 8 to terminal portions 16 in the inner hollow part 6 of the housing A.

One face of the central portion 2 of the housing A is provided with an opening 18 sealingly covered by a window 20 secured in place by a bracket 21 and screws 22, a gasket 23 being interposed between the window 20 and the housing portion 2 for sealing purposes.

The lower end of the housing 2 is open, at 25, the opening 25 being in line with and communicating directly with the hollow interior 6 thereof. Internally threaded bosses 24 are provided by means of which the cover D is adapted to be secured to the lower part of the housing 2 through the action of screws 26, thereby closing and sealing the opening 25, a gasket 28 being interposed between the cover D and the lower edge of the housing 2.

Positioned slightly above the opening 25 in the housing A and on the same side of the housing A as the receiver-supporting portion 4 is an opening 30 having an outwardly projecting externally threaded rim 32 onto which the transmitter B is adapted to be threadedly received.

The central portion 2 of the housing A is also provided with openings 34 and 36 through which project the talk-listen switch J and the ringing generator actuating means L respectively, those openings being sealed by means of flexible rubber boots 38 and 40 respectively secured to the housing by means of screws 41 and clamping frames 42.

*Visual indicator assembly*

The purpose of the visual indicator assembly F is to provide a visual signal at the hand set whenever someone on the other end of the line calls or "rings" the station at which the hand set is located. The visual indicator F may be visually monitored for instant answering whenever any audible signal is inadmissible, but its most usual function is to provide an indication, after the actual "ringing" signal has stopped, that the station in question has been called, so that if the attendant must leave the hand set and then return to it he will be able to tell whether, in the interim, anyone has been trying to reach him. The "ringing" signal is usually in the form of an alternating current derived from a ringing generator such as the generator K subsequently to be described. The "ringing" signal, when received, is often very faint, particularly when the station being called is quite remote from the station doing the calling. Accordingly, the visual indicator F must be capable of actuation by signals of minimal energy content, and the indicator must be capable of being "latched" in actuated condition when such weak signals are detected thereby.

The visual indicator assembly F of the present invention (see Figs. 5–12) is designed as an individual subassembly forming a part of, but readily detachable form, the electrical unit E adapted to be slid into and out of the hollow interior 6 of the housing A. A mounting plate 44, preferably formed of some non-magnetic material, and serving as the structural support for the operative parts of the visual indicator F, has fingers 46 secured thereto by means of screws 48, the fingers extending out from the plate 44 for an appreciable distance and having internally threaded apertures 50 at their ends by means of which the subassembly F may be secured to another part of the electrical unit E. A shaft 52 is rotatively mounted on the plate 44 so as to have as little degree of frictional effect relative thereto as possible, and a target assembly generally designated 54 is mounted thereon so as to rotate therewith. The target assembly 54 includes a hair spring 56 one end of which is operatively connected to the target plate 64 and the other end 58 of which (see Fig. 6) is retained by means of taper pin 60 within a slot in pin 62 carried by the plate 44. The action of the hair spring 56 on the target plate 64 tends to cause it to rotate in a counter-clockwise direction from its position shown in Fig. 6.

The target plate 64 is divided into two wings *64a* each having a central sectoral portion 66 of a color contrasting to that of the remainder of the wing. Secured to the plate 64 and depending therefrom are a pair of diametrically opposed arcuate pole pieces 68 formed of some suitable magnetizable material and joined by connecting web 70. Extending out from the sides of the connecting web 70 adjacent the pole pieces 68 are magnetizable abutments 72. The target assembly 54 is covered by an aluminum plate 74 having legs 76 secured to the panel 44 by means of screws 78, the plate 74 having four radially extending openings 80 of sectoral shape distributed around the axis of the shaft 52, the size and location of the openings 80 being related to the configuration of the target plate 64 and the areas of contrasting color 66 thereon in a manner which will become apparent hereinafter.

Secured to ears 82 extending rearwardly from the panel 44, as by screws 84, are a pair of pole pieces 86 of magnetizable material the lower ends 88 of which extend below the panel 44 and carry a coil 90 between them, that coil having a central magnetizable core 92 the ends of which extend through correspondingly shaped openings 94 in the pole piece ends 88. Lugs 96 extend from the coil 90 so that electrical connection may be made thereto. The upper ends 98 of the pole pieces 86 are arcuate in shape and have a length comparable to the length of the pole pieces 68 secured to the target 54.

A lever 97 is provided with ears 99 pivotally mounted on one of the screws 78, the outer end of the lever 97 having an ear 100 to which vertically extending rod 102 is adapted to be secured, the inner end 104 of the lever 97 extending into the path of travel of one of the abutments 72 of the target assembly 54, that inner lever end 104 carrying a small but strong permanent magnet 106.

Figure 6:
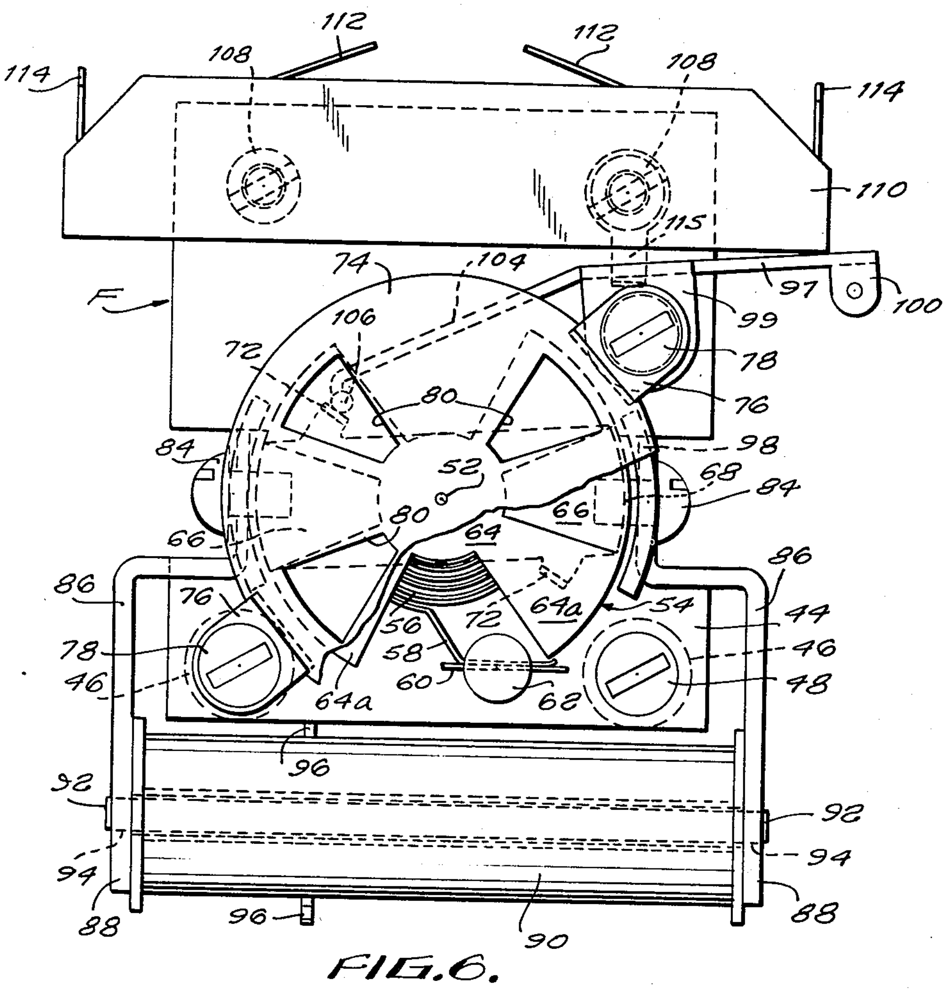
Fig. 6 is a front elevational view thereof, partially broken away.
Figure 9:
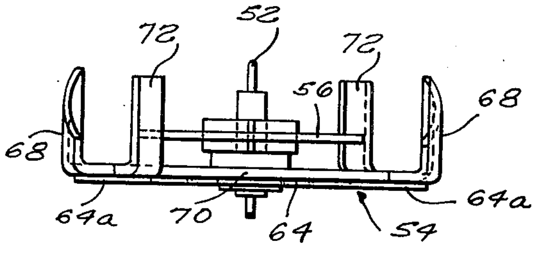
Fig. 9 is a view similar to Fig. 8 but with the assembly rotated ninety degrees counter-clockwise and the view being taken from the top of Fig. 7.

The spatial relationship and arrangement of the parts is such that when the visual indicator F is de-actuated the target plate 64 will, under the influence of the hair spring 56, assume a position rotated approximately thirty degrees counter-clockwise from the position shown in Fig. 6. In that non-actuated position, the abtument 72 will be spaced from the permanent magnet 106, the pole pieces 68 of the target assembly 54 will be out of registration with the arcuate portions 98 of the pole pieces 86, no part of the indicator plate 54 will be visible through one pair of oppositely disposed windows 80 in the plate 74, the space between the wings 64*a* of the target plate 64 then being in registration therewith, and the portions 66 of the target plate 64, preferably of some dull color, will be visible through the other pair of oppositely disposed windows 8. It should be noted in this regard that when the visual indicator assembly F is in proper position in the hollow interior 6 of the housing A, the cover plate 74 will be opposite and in registration with the window 20, so that the openings 80 will be visible therethrough (see Fig. 1).

If now a "ringing" signal should be detected, that signal will energize the coil 90 and as a result the electromagnetic interaction between the fixed pole pieces 98 and the movable pole pieces 68 will cause the latter to move into registration with the former against the action of the hair spring 56. When this occurs those portions of the target plate 64 which contrast in color with the portions 66 thereof, and which may, for example, be bright red in color, will come into registration with the openings 80 in the cover shell 74. Hence a glance through the window 20 will reveal the fact that a ringing signal has been received.

The magnet 106 serves to retain the target assembly 54 in its actuated condition as shown in Fig. 6. As the target assembly 54 moves toward its actuated position, one of the abutments 72 approaches the permanent magnet 106 and is attracted thereby. The closer it approaches, the stronger is the attractive force exerted thereon. Thus the magnet 106 serves to augment the action of the coil 90, when energized, in causing the target assembly 54 to move to actuated position. When the abutment 72 comes up against the magnet 106, the magnetic attraction by the magnet 106 is more than enough to successfully counteract the force of the spring 56, and consequently the target assembly 54 will remain in its actuated position. It is significant to note that although it is thus "latched" in actuated condition, no extra force was required to be exerted thereon by the coil 90 to effectuate the latching action. This is to be markedly contrasted with the usual detenting arrangement, in which extra force is required to engage the detent over and above that which is required to move the target assembly 54 to actuated position apart from the action of the detent.

To release the target assembly 54 from its actuated position and permit it to resume its normal condition it is merely necessary to pivot the lever 97 so as to withdraw the magnet 106 from the abtument 72, this being accomplished by pulling downwardly on the rod 102 by mechanism subsequently to be described. Separation of the magnet 106 from the abtument 72 causes such a decrease in the magnetic attraction between those two elements as to permit the hair spring 56 to take over and return the target assembly 54 to its normal unactuated position.

Figure 3:
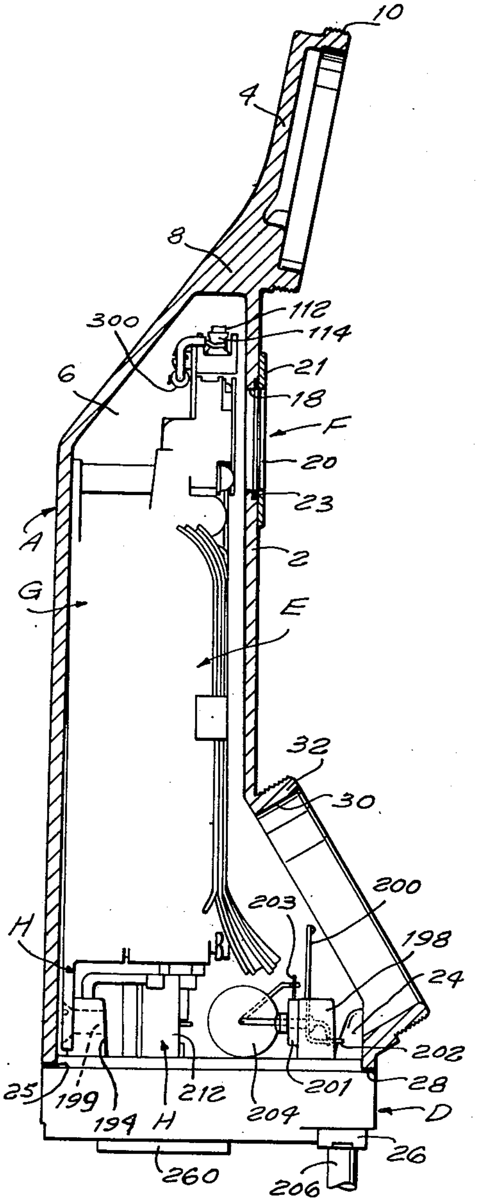
Fig. 3 is a cross seetional view taken along the line 3—3 of Fig. 1, but with the transmitter and receiver removed and with the details of the electrical unit omitted.
Figure 4:
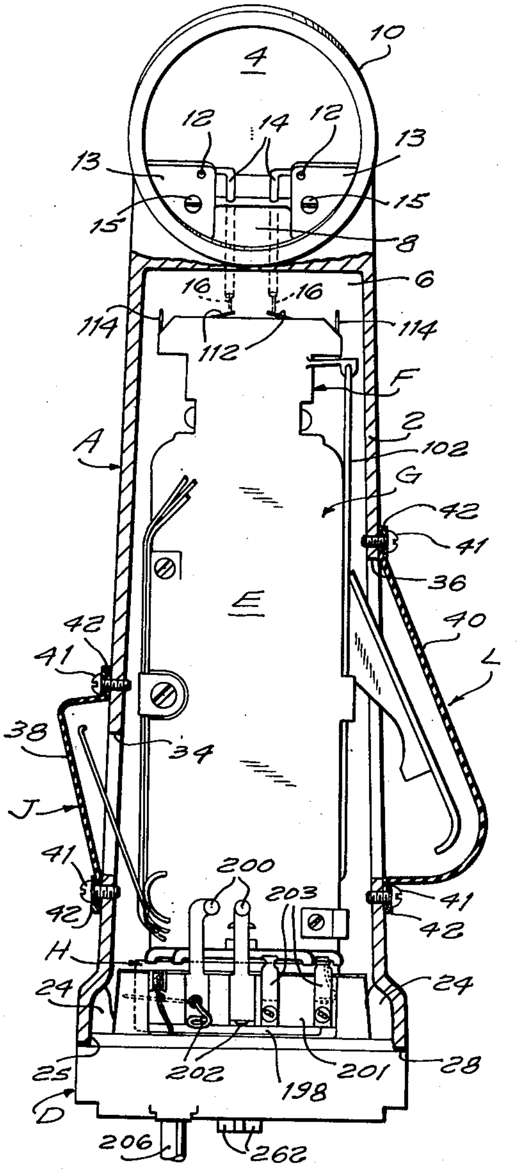
Fig. 4 is a cross sectional view taken along the line 4—4 of Fig. 2 but with the receiver removed and with the details of the electrical unit omitted.
Figure 5:
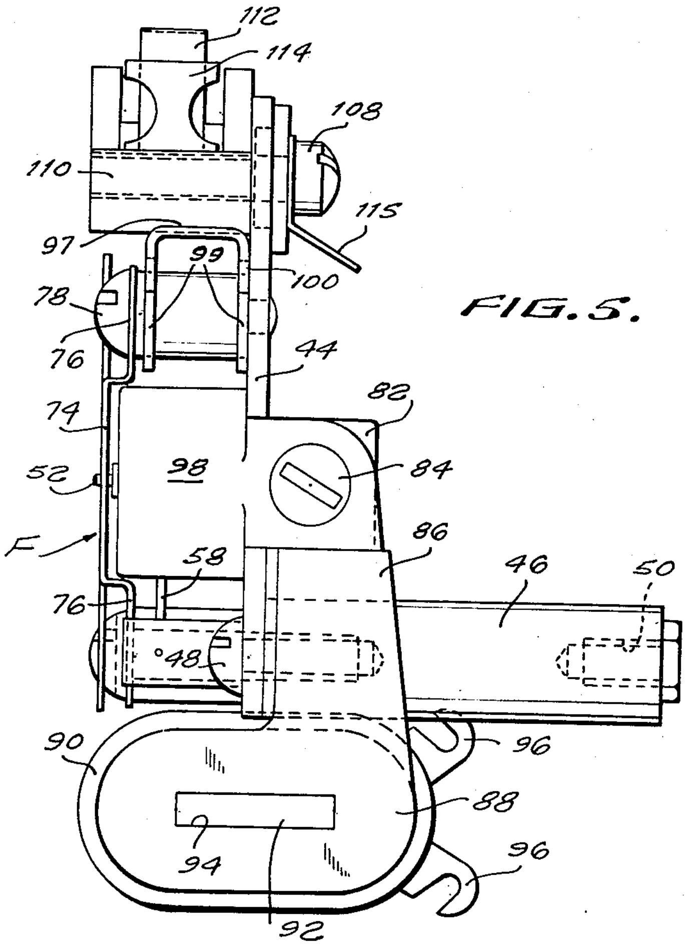
Fig. 5 is a side elevational view, on an enlarged scale, of the visual indicator assembly.
Figure 7:
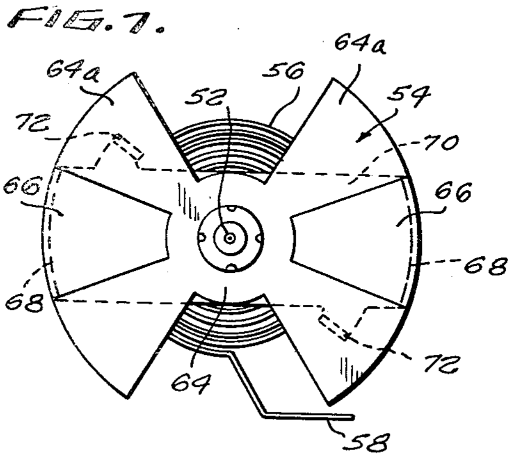
Fig. 7 is a front elevational view of the visual indicator target assembly.
Figure 8:
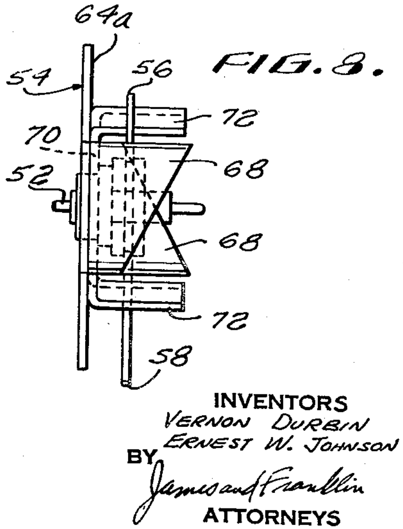
Fig. 8 is a side elevational view of the target assembly of Fig. 7, taken from the right hand side thereof.

Mounted on the top of the plate 44 by means of screws 108 is a terminal assembly 110 which has leaf terminals 112 resiliently extending up therefrom and adapted, when the electrical unit E of which the visual indicator assembly F is a part is inserted into the housing A, to make electrical engagement with the terminal portions 16 extending down from and electrically connected to the receiver C, terminal lugs 114 extending from the assembly 110 and being connected to the terminal portions 112 in any appropriate manner, electrical connections to the terminal lugs 114 being made by soldering or the like. A lug 115 is mounted on one of the screws 108, resistor 300 being physically and electrically connected between it and the opposite terminal lug 114 (see Fig. 3).

*Power unit assembly*

The power unit assembly G carries the talk-listen switch J, the ringing generator K and the actuating means L therefor. It also serves to secured the visual indicator assembly F to the cover D. It comprises (see Figs. 10–13) a mounting plate assembly 116 to the upper end of which the fingers 46 of the visual indicator assembly F are secured by means of screws 118, thus mounting the visual indicator assembly F thereon. The ringing generator K, comprising a rotor 122 and a field assembly 120 including coils 121, defines a permanent magnet alternator, is supported on the mounting plate assembly 116 in any appropriate manner, as by means of top and bottom plates 123 secured to the mounting plate 116 by means of screws 125 and spacers 127. The rotor 122 is secured to shaft 124 on which gear 126 is mounted, this in turn meshing with gear 128 on shaft 130, smaller gear 132 rotating therewith and meshing with gear 134 freely rotatably mounted on shaft 136. The interior of the gear 134 is hollowed at 138, and a ball-type one-way friction clutch assembly 140 of known construction is incorporated therein, the actuating central portion 142 thereof being rotatably fast on collar 144 which is in turn freely rotatable on shaft 136, has a non-circular outer periphery, and has an arm 146 connected thereto for rotation therewith, a first spring 148 being connected between the arm 146 and one of the screws 125, a second spring 152 being connected between the arm 146 and the end of lever 154 rotatably mounted on the mounting plate assembly 116 by means of another of the screws 125 and having an extension 158 adapted to project out through the opening 36 in the housing A and into the boot 40. A pin 159 on the plate 116 constitutes a positive stop for movement of the lever 154 in a clockwise direction as viewed in Fig. 12.

The arrangement of parts and the operative action of the one-way friction clutch assembly 140 is such as to provide for the following mode of operation. When the lever extension 158 is released the spring 148 moves the arm 146 to the position shown in Fig. 12 and the spring 152 moves the lever 154 to the illustrated position engaging the stop pin 159. The spring 152 is stronger than the spring 148. Consequently when the extension 158 is pushed in toward the mounting plate 116, as by manual depression of the boot 40, the lever 154 will pivot in a counter-clockwise direction as viewed in Fig. 12 and the arm 146 will be pivoted in the same direction, the spring 148 being extended. The one-way clutch assembly 140 will then impart rotation to the shaft 124 of the rotor 122 of the ringing generator K via the gear reduction train 134, 132, 128, 126, thus causing the rotor 122 to rotate rapidly. When the lever extension 158 is released the parts will resume their position shown in Fig. 12, but the one-way clutch will slip, thus permitting the rotor 122 of the ringing generator K to continue to rotate. Consequently repeated actuation of the lever extension 158 will cause the rotor 122 of the ringing generator K to come up to proper rotative speed and to continue to rotate for as long as the lever extension 158 continues to be alternately depressed and released. This induces an alternating current in the coils 121 defining a ringing signal which, when transmitted through the external line 206, will actuate the appropriate visual and/or audible indicator assemblies at stations elsewhere on the line.

Figures 12, 13:
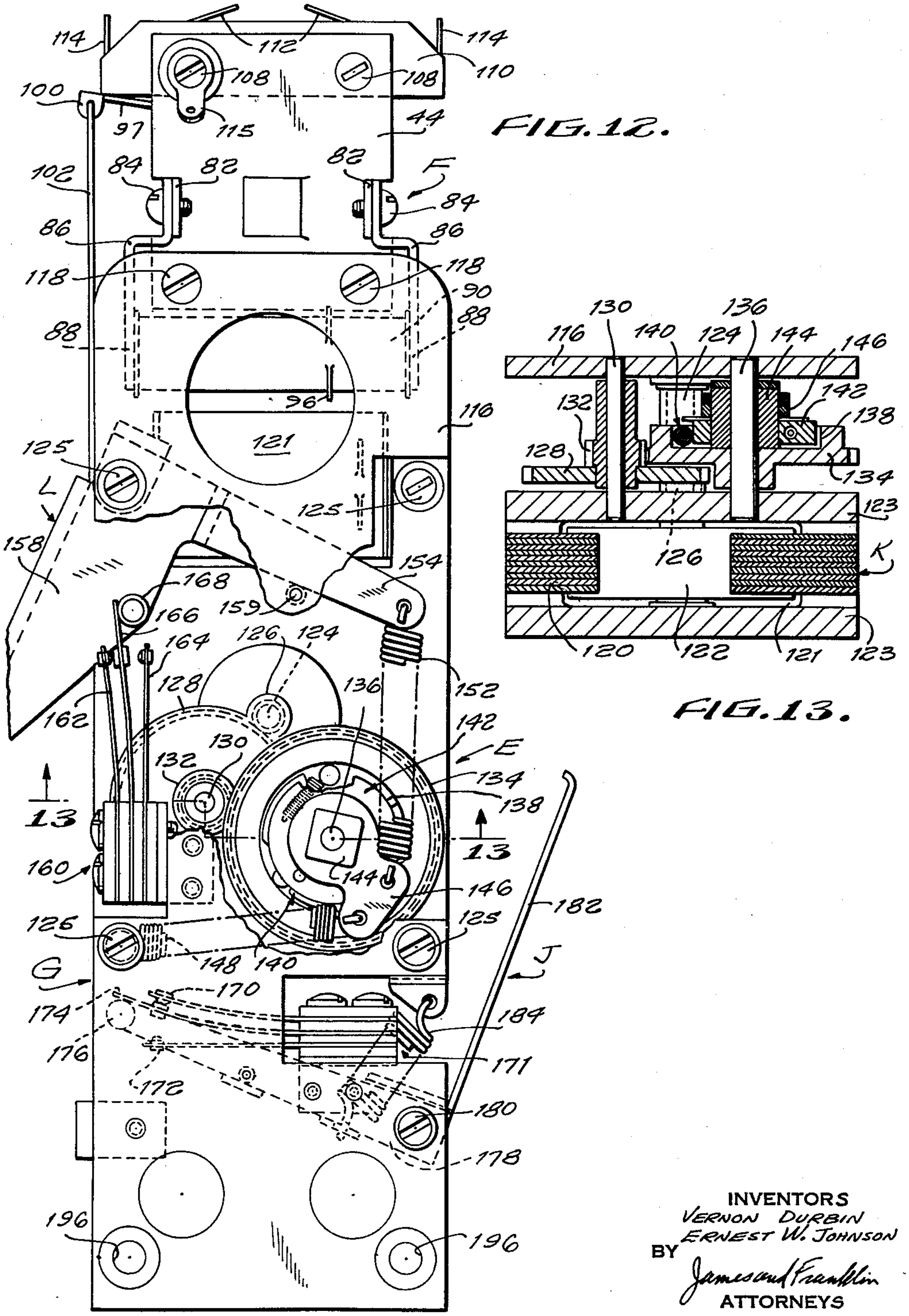
Fig. 12 is a rear elevational view of the sub-assembly of Fig. 10, partially broken away.
Fig. 13 is a cross sectional view taken along the line 13—13 of Fig. 12.
Figure 17:
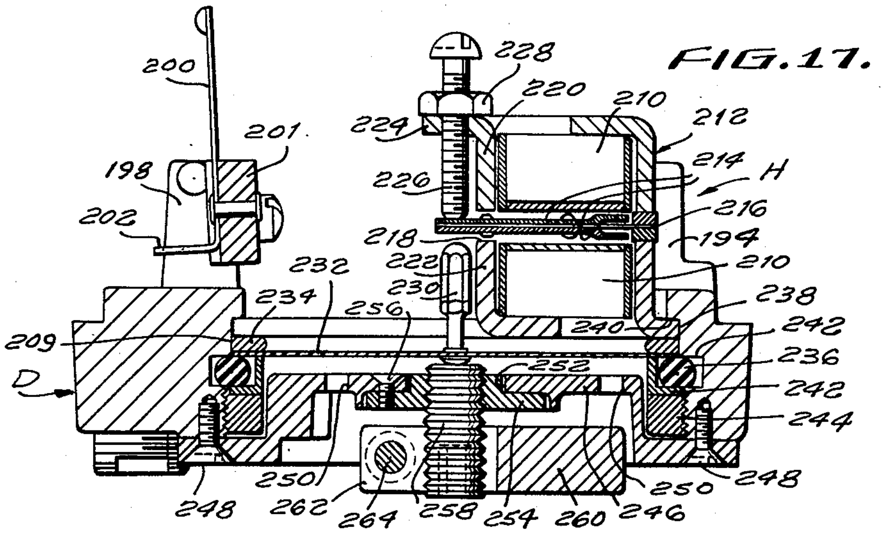
Fig. 17 is a cross sectional view taken along the line 17—17 of Fig. 16.
Figure 15:
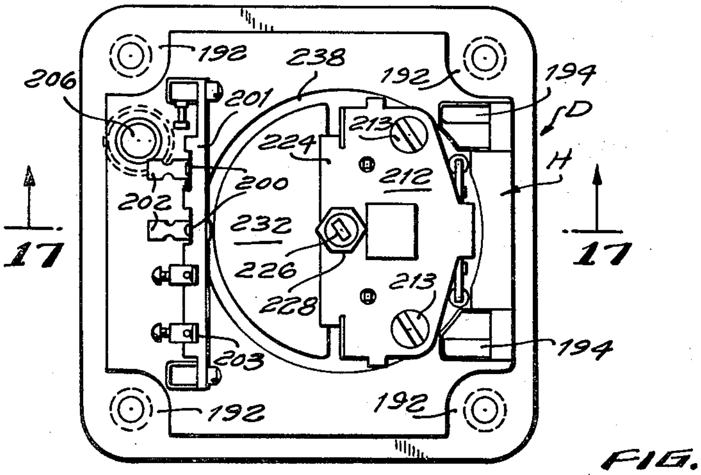
Fig. 15 is a top plan view, on an enlarged scale, of the cover with the audible indicator assembly attached.
Figure 16:
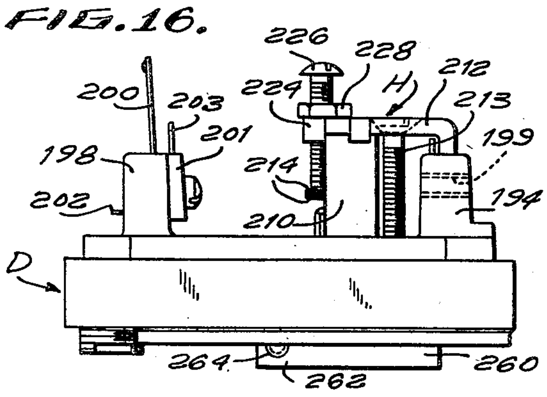
Fig. 16 is a side elevational view of the sub-assembly of Fig. 15.

Mounted on the mounting plate assembly 116 is a switch unit generally designated 160 and comprising a pair of outer opposed flexible contacts 162 and 164 and an intermediate flexible contact 166 having a projecting tip adapted to be engaged by projection 168 on the lever extension 158. When the lever 154 is in its normal position, as shown in Fig. 12, the projection 168 will engage the intermediate contact 166 and move it to the position shown, where it is disengaged from contact 164 and engaged with contact 162. Because of the electrical connections made to the various contacts via lugs 169, this will condition the hand set for audible communication and for the receiving of a ringing signal from some other station, and will disconnect the ringing generator K from the line. However, when the lever extension 158 is actuated so as to cause the lever 154 to pivot in a counter-clockwise direction, the projection 168 will move away from the intermediate contact 166, and the inherent resiliency of the contact 166 will cause it to move to engagement with the contact 164 and out of engagement with the contact 162, thus connecting the ringing generator K to the line and disconnecting the receiver so as to prevent the reception of undesired noise during the time that some other station is being called.

A second switch assembly 171 is also mounted on the mounting plate assembly 116, that assembly comprising outer opposed flexible contacts 170 and 172 and intermediate flexible contact 174, the latter being engaged by projection 176 on lever 178 pivotally mounted on the mounting plate assembly 116 by means of the screw 180 and having an extension 182 adapted to project out through the opening 34 in the housing A and into the boot 38. A spring 184 is active between the mounting plate assembly 116 and the lever 178 so as to bias the latter to its normal position pivoted in a clockwise direction to the position shown in Fig. 12, in which position the projection 176 moves the intermediate contact 174 into engagement with the contact 170 and out of engagement with the contact 172. This will condition the unit, through appropriate electrical connection, for reception but not for transmission. When, however, the lever extension 182 is moved in toward the mounting plate assembly 116, as by depressing the boot 38, the lever 178 will be caused to pivot in a counter-clockwise direction against the action of the spring 114, thus permitting the intermediate contact 174 through its own inherent resiliency to disengage from the contact 170 and engage with the contact 172, thus conditioning the unit for transmission. The switch 168 and the lever 178, 182, therefore define the talk-listen switch J.

Figures 10, 11:
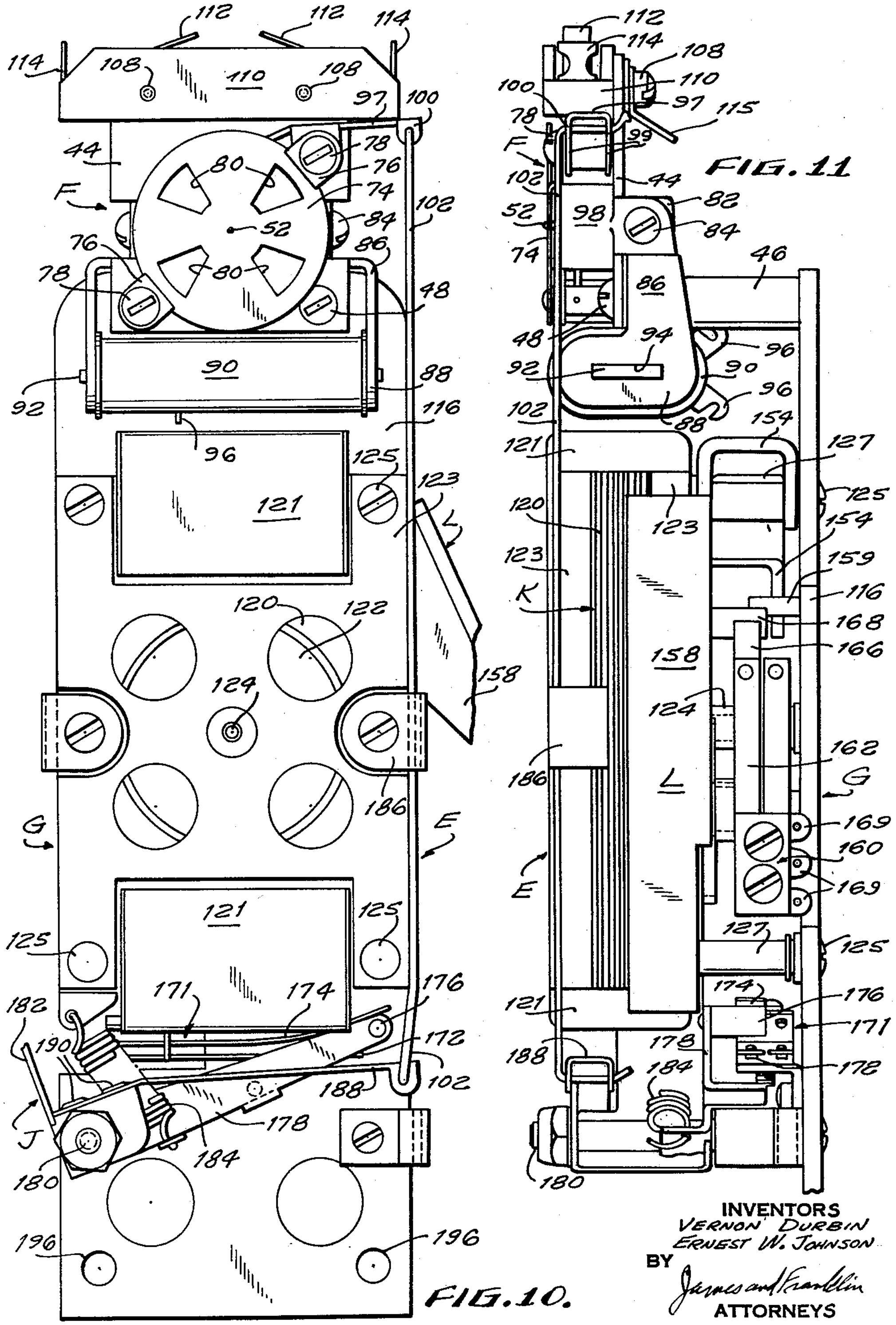
Fig. 10 is a front elevational view of the visual indicator assembly and power unit assembly secured together.
Fig. 11 is a side elevational view of the sub-assembly of Fig. 10.

The rod 102, which extends down from the lever 96 to which is secured the permanent magnet 106 of the visual indicator assembly F, is guided by clip 186 and is secured to leaf spring 188 mounted by means of rivets 190 on the lever 178. When the lever 178 is in its normal position, as shown in Figs. 10 and 12, the leaf spring 188 biases the rod 102 upwardly, thus moving the permanent magnet 106 into the path of movement of an abutment 72 of the target assembly 54. However, whenever the lever 178 is pivoted to "talk" position the leaf spring 188 will be pivoted in a clockwise direction as viewed in Fig. 10, the rod 102 will be pulled down, the permanent magnet 106 will be separated from the abutment 74, and the target 54 will be released so as to resume its non-actuated condition. This provides an automatic interlock between the talking circuit and the visual indicator assembly F so that, with no attention required on the part of the operator, each time that a call is answered the visual indicator F will automatically be returned to its non-actuated condition.

*Cover and audible indicator assembly*

The cover D, which may be formed of any suitable material such as Dowmetal, is so shaped as to fit over and close the open lower end 25 of the housing A and is provided with bosses 192 registrable with the bosses 24 in the lower end of the housing A, screws 26 being passable therethrough so as to secure the cover D in place on the housing A. A pair of lugs 194 extend up from the cover, and the mounting plate assembly 116 of the power unit assembly G is adapted to be secured thereto, the mounting plate 116 having apertures 196 through which screws may pass, those screws engaging with suitable apertures 199 in the lugs 194. An upward protrusion 198 opposite the lugs 194 carries a terminal assembly 201 including upwardly projecting resilient terminal lugs 200 adapted to make electrical connection with appropriate portions of the transmitter B when the latter is screwed into place and being electrically connected to terminal lugs 202 to which appropriate electrical connection is to be made. Other terminals 203 are also provided on the part 198 and a filter condenser 204 is there connected and mounted in place (see Fig. 3). Leads extend from this terminal assembly out through the cover D to the line 206 which in turn extends to a detachable connector 208 of any desired type.

The audible indicator assembly H is mounted directly on the upper portion of the cover D, that cover being centrally apertured at 209 for the purpose of providing control of the amplitude of sound emanating from the audible indicator H. A coil 210 is mounted within a magnetizable framework generally designated 212 and secured to the cover D by means of screws 213, and an armature defined by a pair of magnetically attractable sheets 214 on opposite sides of a flexible leaf spring 216 is interposed within the coil 210 and extends into the air gap 218 between the pole pieces 220 and 222. The upper pole piece 220 is provided with an outwardly extending portion 224 through which screw 226 extends, that screw having a lock nut 228 engaging the upper surface of the finger 224 so that the position of the screw 226 may be adjusted and fixed in adjusted position. The tip of the armature 214, 216 is interposed between the end of the screw 226 and the tip of a plunger 230 which is secured to diaphragm 232, the latter being mounted between a spacer ring 234 and a gasket 236 in the central opening 209 of the cover D, the spacer ring 234 being prevented from moving upwardly because it is compressed between diaphragm 232 and an outwardly extending ring rim 238 forming a part of the magnetizable framework 212, the ring rim 238 being snugly received under a shoulder 240 in the central opening 209 of the cover D, the gasket 236 being sealingly retained in place against the diaphragm 232 and a second shoulder 242 in opening 209 of the cover D by means of a retainer 242 held in place by a nut 244 threadedly engaged with an appropriate portion of the cover D. The leaf spring 216 is so biased as to urge the upper sheet 214 carried thereby against the tip of the screw 226.

A diaphragm cover 246 is secured in place over the diaphragm 232 and the nut 244 by means of screws 248 engaged with the housing cover D. The diaphragm cover 246 is provided with openings 250 through which sound can pass. Its central portion is apertured, at 252, and a sealing bushing 254 is secured therein by means of screws 256, an adjusting screw 258 sealingly threadedly passing through the bushing 254 and into engagement with the plunger 230 where the latter engages the diaphragm 232. A knob 260 is secured to the adjusting screw 258, having a split end 262 adapted to be clamped to the adjusting screw 258 by means of screw 264, the knob 260 being adapted to cooperate with appropriate indicia 266 on the outer face of the diaphragm cover 246, those indicia indicating the desired volume of sound.

Figure 14:
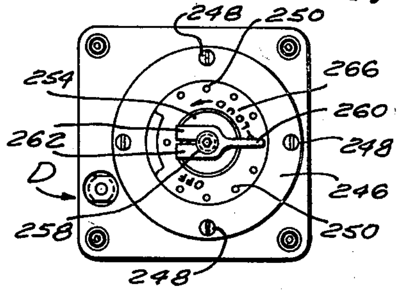
Fig. 14 is a bottom plan view, on a reduced scale, of the cover for the bottom of the housing.

The operation of the audible indicator assembly H is as follows. When a ringing signal is received the coils 210 are energized by an alternating current and the armature 214, 216 is caused to vibrate, adjustment of the screw 226 fixing the normal position of the armature and the size of the active air gaps so as to provide for optimum operation. As the armature vibrates it taps the plunger 230 and tends to cause the diaphragm 232 to vibrate, emitting sound. If maximum sound amplitude is desired, the handle 260 is swung as far as it will go in a counterclockwise direction as viewed in Fig. 14, thus backing off the adjusting screw 258 and permitting the diaphragm 232 maximum amplitude of vibration. If no audible signal is desired, the handle 260 is swung as far as it will go in a clockwise direction as viewed in Fig. 14, thus screwing the adjusting screw 258, in, forcing the central portion of the diaphragm 232 and the plunger 222 upwardly, and clamping the armature 214, 216 between the plunger 232 and the screw 226, thus positively preventing any vibration thereof and hence completely eliminating sound. The intensity of sound may be graduated to any desired degree by positioning the handle 260 between the two extreme positions thus described.

A belt mounting clip 265 may be attached to the cover D for convenience in transporting the handset (see Fig. 2).

*Electrical circuits*

Figure 18:
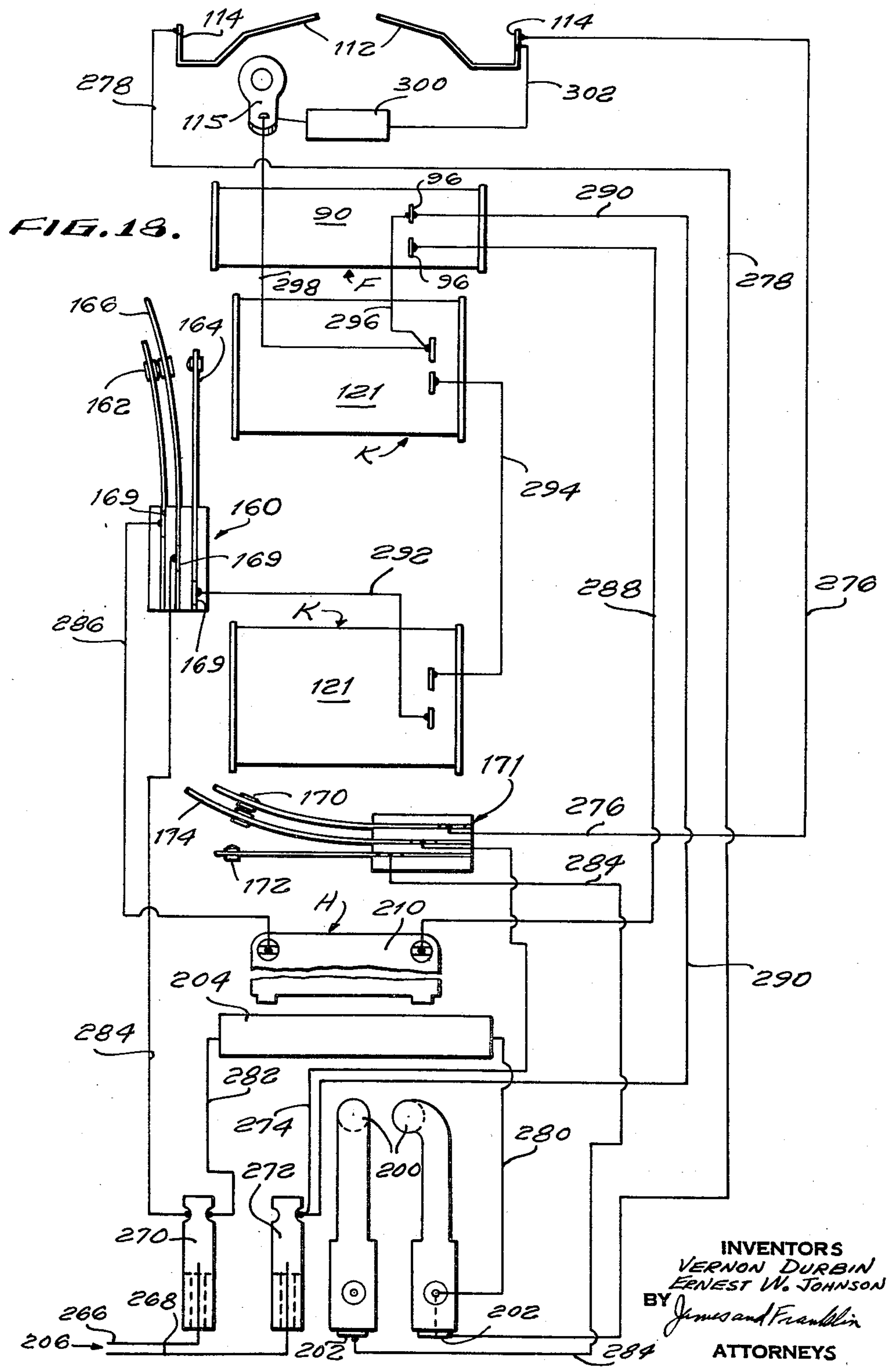
Fig. 18 is a schematic wiring diagram of the various components of the hand set.

The electrical interconnection of the various units of the handset can best be seen from the schematic wiring diagram of Fig. 18. The transmitter B and the receiver C have been omitted therefrom, the terminals 200 for the transmitted B and the terminals 112 for the receiver C being shown, however. The outside line 206 consists of two wires 266 and 268, each of which are led to terminals 270 and 272 respectively on the cover D. Lead 274 connects terminal 272 to the intermediate terminal 174 of talk-listen switch 171, the terminal 174, in the normal condition of the apparatus, being in engagement with the terminal 170 and out of engagement with the terminal 172. Lead 276 connects the terminal 170 via a terminal 114 with one of the terminals 112 for the receiver C, the other side of the receiver C being connected by means of the other terminals 112 and 114 and lead 278 to one of the terminals 200 and then, via lead 280, to one side of the capacitor 204, the other side of the capacitor 204 being connected by lead 282 to the terminal 270 and the other outside wire 266. Thus a circuit is connected through the receiver C so that any audible signals can be detected thereby.

The left hand transmitter terminal 200 is connected by means of lead 284 to the outer terminal 172 of the switch 171. With the switch 171 in its normal position, as illustrated, the intermediate terminal 174 being separated from the outer terminal 172, the circuit through transmitter B is open and sound will not be transmitted thereby. However, when the talk-listen switch 171 is closed, the intermediate terminal 174 becomes disengaged from the terminal 170 and engaged with the terminal 172. A circuit may then be traced from the terminal 172 through the terminal 174, the lead 274 and the terminal 272 to the outside wire 268, the other outside wire 266 being connected by means of terminal 270, lead 282, capacitor 204 and lead 280 to the other terminal 200 for the transmitter B. Hence when the talk-listen switch J is actuated the circuit through the transmitter B is completed and sound may be transmitted thereby.

When a ringing signal is emitted by some other station on the line 206, the ringing circuit in the handset may be traced as follows: From the wire 266 through the terminal 270 and lead 284 to the intermediate terminal 166 of the switch 160. With the handset in its standby state, as shown in Fig. 12, the intermediate terminal 166 is in engagement with the outer terminal 162 and out of engagement with the outer terminal 164. From the terminal 162 the circuit may be traced via lead 286 to the coil 210 of the audible indicator assembly H, from it via lead 288 to the coil 90 of the visual indicator assembly F and then from the coil 90 via lead 290 to the terminal 272 and the other wire 268 of the line 206. Hence in standby condition the switch 160 is so conditioned that the audible indicator assembly H and visual indicator assembly F are ready for action.

When the ringing generator K is actuated an electrical signal is generated in its coils 121. At the same time, the switch 160 is modified so that the central terminal 166 thereof becomes disengaged from the terminal 162 and engages with the terminal 164. A circuit is thus closed within the handset between wires 266 and 268 as follows: From wire 266 through terminal 270, lead 284, intermediate switch terminal 166, outer switch terminal 164 and the lead 292 through one of the ringing generator coils 121, then via lead 294 through the other ringing generator coil 121, then via leads 296 and 290 and terminal 272 to the other wire 268.

Lead 298 also connects one end of the second recited ringing generator coil 121 to resistor 300 via lug 115, that circuit continuing via leads 302 and 276 through terminals 174 and 170 of switch 171 and lead 274 to the terminal 272. As a result the resistor 300 is short circuited by lead 276, switch terminals 174 and 170 and lead 274 whenever the switch terminals 174 and 170 are engaged, which will be the case whenever the talk-listen switch J is in the "listen" position. However, when it is in the "talk" position, with the terminals 174 and 170 disengaged, then the receiver circuit C may be traced from wire 268 through terminal 272, leads 290, 296 and 298, through resistor 300 and lead 302 to one of the receiver terminals 112, through the receiver C, and then from the other receiver terminal 112 through lead 278 to one of the terminals 200, then through lead 280, capacitor 204 and lead 282 to terminal 270 and wire 277. Thus the sound transmitted by the transmitter B will also be heard through the receiver C, but with the volume thereof reduced through the action of the resistor 300.

*Summary*

Structurally the handset of the present invention is extremely compact and rugged. When all of the components are in place the interior 6 of the housing A is completely sealed. The transmitter B and receiver C may be unscrewed and replaced without adjusting any of the inner components of the unit, and connection to the transmitter B and receiver C is automatically effectuated when they are in place. The audible indicator assembly H is mounted directly on the cover D, as is the power unit assembly G, the visual indicator assembly F being mounted in turn on the power unit assembly G. Thus the cover D together with the assemblies F, G and H define an electrical and mechanical unit removable from and replaceable into the housing A quite readily. All that need be done is to remove or attach four screws 26. Each of the assemblies F, G and H can readily be detached from one another and from the cover D for individual replacement or repair.

Operationally, too, the unit of the present invention has numerous advantages. Because the audible indicator assembly H is mounted directly on the cover D it is in excellent position to permit its signal to be muffled temporarily when that is desired, and, when the signal is very faint or when outside noise is at a high level, the handset may be held up with the cover D against the ear so that even the faintest "ringing" sound can be heard. Moreover, the intensity of the "ringing" sound may be manually adjusted and varied at will in accordance with the prevailing tactical situation.

The visual indicator assembly F is much more sensitive than any which has been devised in the past for this purpose. It is so constructed that the latching arrangement which retains the target assembly 54 in actuated position, far from requiring an excess of force exerted on the target assembly 54 for the proper operation thereof, aids in its actuation, thus ensuring that any received ringing signal strong enough to move the target assembly 54 almost to its fully actuated position will be effective to cause the assembly F to become fully actuated and remain latched in that position. An automatic interlock provides for de-actuation of the visual indicator assembly F whenever the handset is used for transmission.

All of the assembles are formed of elements readily fabricatable on a mass production basis and readily assembled one with the other.

While but a single embodiment of the present invention has been here disclosed, it will be apparent that many variations may be made in the details thereof, all within the scope of the following claims.

We claim:

1. A field telephone comprising a casing on which a microphone and an earpiece are, said casing having a window therein and an opening at one end thereof, a unitary assembly adapted to be inserted into said casing via said open end, said assembly comprising a visual call indicator means positioned opposite said window, a calling means, terminal elements detachably electrically connectable to said microphone and earpiece respectively by the insertion of said assembly in place in said casing, an audible call indicator means, and associated circuitry including a talk-listen switch, and a cover closing said open casing end, said casing having openings, means on the exterior of said casing passing through said openings and operatively connected respectively for actuating purposes to said ringing unit and said talk-listen switch, said visual call indicator means comprising a coil, an armature operatively associated with said coil, biased to inoperative position relative to said window and movable to operative position relative to said window when said coil is energized, a magnet movable between a first position close to the operative position of said armature and a second position remote therefrom, said magnet having a strength sufficient to overcome the biasing on said armature when said armature is in its operative position and when said magnet is in its first position, thereby retaining said armature in its operative position, the strength of said magnet being insufficient to overcome said bias when said magnet is in its second position, means for biasing said magnet to its first position, and an operative connection between said talk-listen switch and said magnet effective to move the latter to its second position when said switch is actuated for talking.

2. The field telephone of claim 1, in which said cover is a part of said unitary assembly, so that when said cover is removed from said casing said unitary assembly is removed therewith.

References Cited in the file of this patent

UNITED STATES PATENTS

| | | |
|---|---|---|
| 1,526,494 | Henschel | Feb. 17, 1925 |
| 1,930,270 | Hayward | Oct. 10, 1933 |
| 2,183,744 | Hubbell | Jan. 13, 1936 |
| 2,223,144 | Wheelock | Nov. 26, 1940 |
| 2,252,751 | Benisek | Aug. 19, 1941 |
| 2,298,207 | Gent | Oct. 6, 1942 |
| 2,308,550 | Shapiro | Jan. 19, 1943 |
| 2,332,448 | Inglis | Oct. 19, 1943 |
| 2,338,757 | Curran | Jan. 11, 1944 |
| 2,377,162 | Long | May 29, 1945 |
| 2,385,339 | Atkins | Sept. 25, 1945 |
| 2,420,638 | Hellman | May 13, 1947 |
| 2,439,408 | Mitchell | Apr. 13, 1948 |
| 2,468,474 | Whidden | Apr. 26, 1949 |
| 2,485,615 | Lomholt | Oct. 25, 1949 |
| 2,578,367 | Mott | Dec. 11, 1951 |
| 2,686,835 | Gottlieb | Aug. 17, 1954 |

OTHER REFERENCES

War Dept., Technical Manual, TM 11–2059 (9 Dec. 1944).